UNITED STATES PATENT OFFICE.

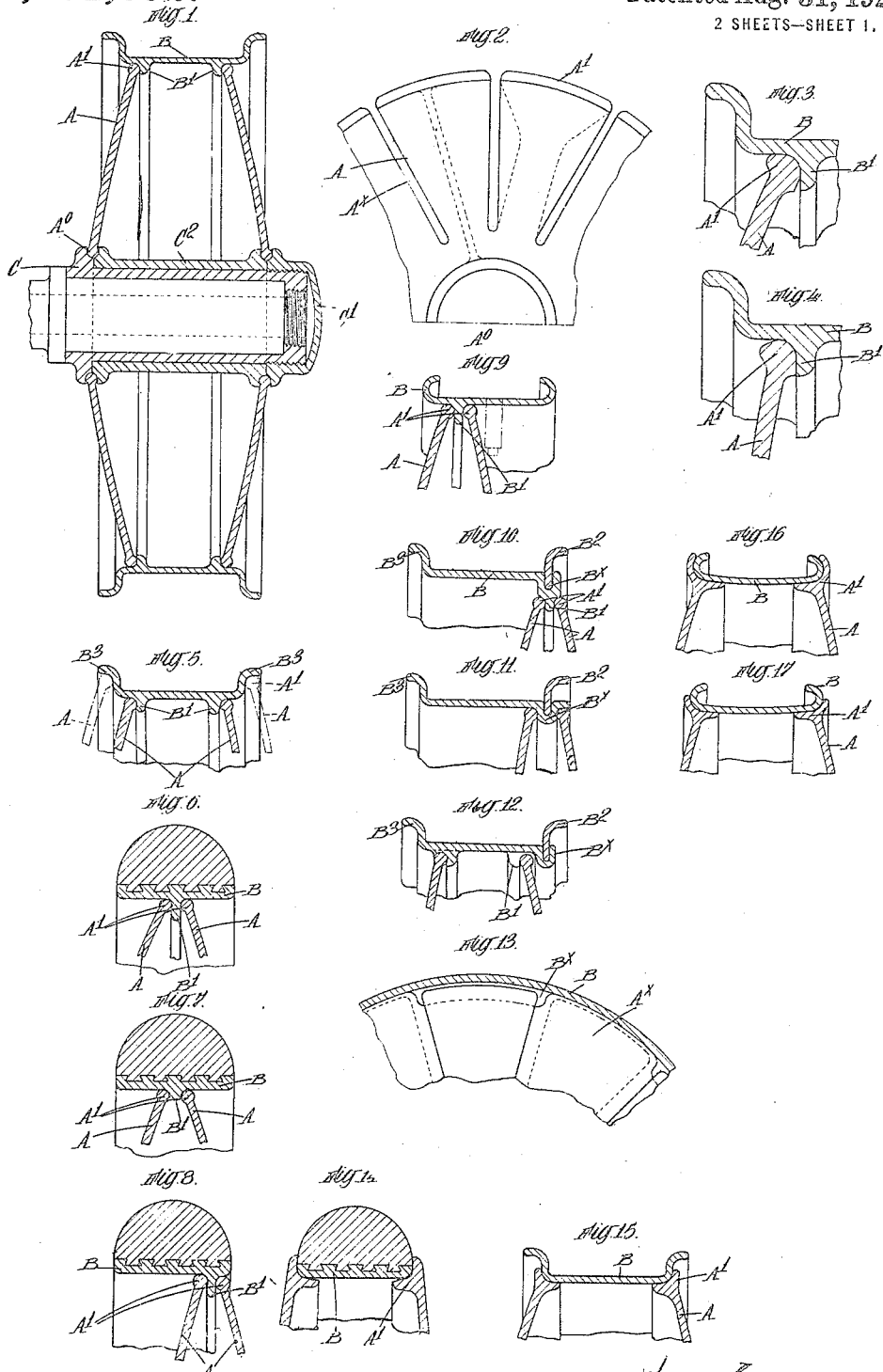

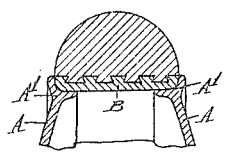
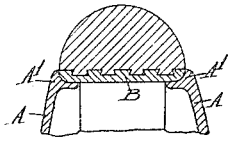
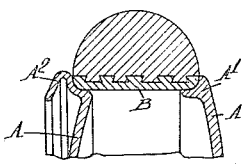
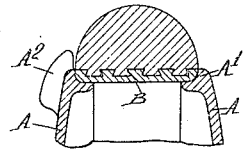
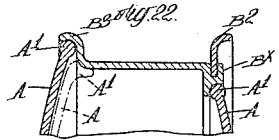
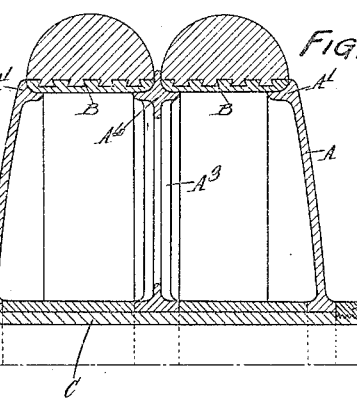
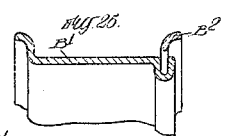
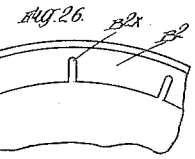
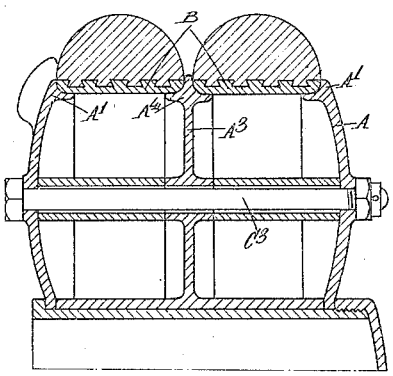
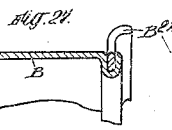
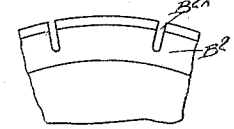
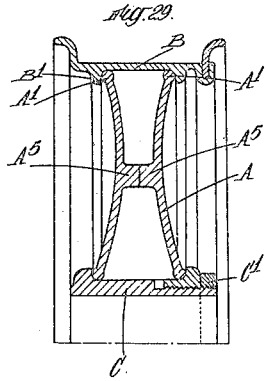
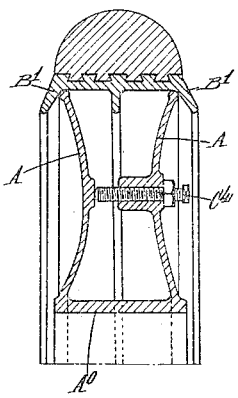
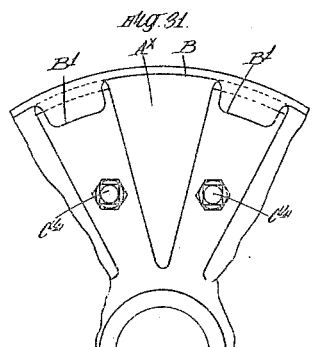

COLIN MACBETH, OF BIRMINGHAM, ENGLAND, ASSIGNOR TO THE DUNLOP RUBBER COMPANY, LIMITED, OF WESTMINSTER, LONDON, ENGLAND.

VEHICLE-WHEEL.

1,351,052.  Specification of Letters Patent.  Patented Aug. 31, 1920.

Application filed November 14, 1919. Serial No. 338,003.

*To all whom it may concern:*

Be it known that I, COLIN MACBETH, a subject of the King of Great Britain, residing at Para Mills, Aston Cross, Birmingham, in the county of Warwick, England, have invented certain new and useful Improvements in Vehicle-Wheels, of which the following is a specification.

This invention relates to metal vehicle wheels and has general reference to certain constructions of the wheel set forth in the specification of my United States Patent No. 1305820 in which the spoke members (which are separate or in one piece) are adapted to be radially expanded by applying a transverse or axial thrust or pressure thereto so as to cause the outer part or parts on which the tire base or rim is seated to bear against the latter without being transversely or axially moved.

The present invention refers more particularly to the construction of the wheel in which the spoke members are vertically or circumferentially divided at the outer or rim part, the spoke members being separate from each other on each side of the vertical plane of the wheel or connected so as to be in one piece, for example, by a common hub or annular portion which surrounds the wheel hub or any other suitable seating.

According to the present invention I provide between the tire base or rim and the outer or rim parts of the spoke members, rounded or spherical engaging surfaces which permit of a slight relative adjustment or movement during the radial expansion of the spoke members to enable the said outer parts of the latter to properly engage with the tire base or rim. The construction, however, is such that the outer or rim parts of the spoke members do not move axially or transversely during the expansion, and the adjustment or movement which does take place is in the nature of a slightly rocking or angular movement. The spoke members may be dished or coned in opposite directions, and they may be radially or transversely split from the outer parts to near the inner or hub portion without dividing the latter.

In order that the said invention may be clearly understood and readily carried into effect, the same will now be described more fully with reference to the accompanying diagrammatic drawings, in which:—

Figure 1 is a transverse sectional view of one construction of the improved wheel, Fig. 2 is a fragmentary side view of one of the spoke members employed in the wheel shown in Fig. 1.

Figs. 3 and 4 are fragmentary sectional views showing on an enlarged scale one form of engaging surfaces or parts provided on the spoke members and the tire base or rim, the spoke members having beaded or substantially spherical seatings for engaging with rounded surfaces on the tire base or rim.

Fig. 5 is a sectional view showing the spoke members such as shown in Figs. 3 and 4 engaging with channel shaped rim at or near the side portions thereof.

Figs. 6 and 7 are similar views showing the spoke members engaging with a solid tire base or band at or near the middle part thereof, Fig. 8 is a similar view showing the spoke members engaging with a solid tire base at one side thereof, Figs. 10, 11, and 12 are sectional views showing a channel shaped rim with detachable tire retaining flanges and the three modes of effecting the engagement between the spoke members and the rim, Fig. 13 is a fragmentary sectional side view of the construction shown in Fig. 12, Fig. 14 is a sectional view showing a solid tire supported on or in jaw shaped parts formed on the outer portions of the spoke members, Fig. 15 shows a somewhat similar arrangement applied to a channel shaped rim, Figs. 16 and 17 also show similar arrangements as applied to a pneumatic tire rim, Figs. 18 and 19 are similar views to Fig. 14 illustrating slight modifications, Figs. 20 and 21 are also similar views to Fig. 14 in which the outer spoke members are formed with protecting portions, Figs. 22 and 22ª show modifications in which one spoke member is formed with a jaw seating and the other is formed with a spherical or beaded seating.

Figs. 23 and 24 show a portion of a wheel carrying twin tires which are situated in jaw seatings between three spoke members, Figs. 25 to 28 are detail views of a detachable flange such as employed in the construction shown in Figs. 10 to 12, Figs. 29 and 30 are transverse section views showing spoke members which are inwardly dished as distinct from the outwardly dished spoke members shown in the preceding figures, Fig. 31 is a partial side view of the construction shown in Fig. 30.

Throughout the various figures A A are the two spoke members or disks of each wheel, the disks being formed with radial gaps $A^x$ extending from near to an undivided hub or central portion $A°$ to and through the peripheries or outer parts of the disks see Fig. 2. B is the tire base or rim which may be the foundation band of a solid tire or a channel rim for a solid tire or a pneumatic tire. In the examples shown in Figs. 1 to 13, 22, 29 and 30 the outer parts of the spoke members or disks A A may be slightly enlarged to form a kind of beading A' A' with a rounded or approximately spherical external bearing surface, the beadings being divided or non-continuous owing to the radial gaps $A^x$. The beaded or rounded parts A' are adapted to engage with continuous or spaced flanges or stops B' B' on the inner surface of the tire base or rim, two of which stops may be disposed near to the edges of the rim as shown for example in Figs. 1, 3 and 4, the shape of the beaded parts A' and the stops B' being shaped as shown in the enlarged diagrammatic views shown in Figs. 3 and 4. The radial expansion of the spoke members A A may be effected by any appropriate means such as by bolts passing through the disks near the hub as set forth in the specification of my prior application No. 121757 or by means of a flanged sleeve C screw threaded to receive a flanged nut C' which is tightened up so that flanges approach each other and bear against the inner parts $A°$ of the disks with a flange sleeve $C^2$ interposed between the disks. The outer or beaded parts A' of the disks A being held against transverse movement tend to be straightened out by the movement of the flanged sleeve C and the flanged nut C' so that the beaded parts slightly rock from a position shown in Fig. 3 to the position shown in Fig. 4. In some cases only one flange or stop B' may be provided on the inner surface of the tire base or rim and it may be disposed at the middle of the rim or base see Figs. 6 and 7 or near either side or edge thereof, see Figs. 8 and 9, in these cases the beaded parts A' A' of the spoke members lie against each side of the solid flange or stop B'. When the flange or stop B' is disposed near one side of a rim carrying a pneumatic tire as shown in Fig. 9 one of the spoke members at its outer part is disposed between the tire valve and the aforesaid stop B' so that the valve is always exposed and is readily accessible. In the examples shown in Figs. 10 to 12 the flange or stop B' may be formed on a part $B^x$ of a rim shaped to form a groove which receives a detachable side flange $B^2$ capable of being expanded or contracted in applying it to or removing it from the rim. The sides of the said grooved part $B^x$ may form the equivalent of the stops B' as shown in Fig. 11. When a channel shaped rim is used as shown in Fig. 5 the outstanding rim flanges may be laterally curved outwardly as at $B^3$ to form bearing surfaces for the rounded or beaded parts A' of the spoke members. Only one such bearing surface may be used and the other bearing surface for the other spoke member may be formed on the inner surface of the rim, for example, by or on a grooved part $B^x$ which receives a detachable side flange as shown in Fig. 22. By this latter arrangement spoke members of different diameters may be used on the same wheel. In some cases the spoke members as shown in Figs. 12 and 13 are provided with side radial openings or gaps $A^x$ and said grooved part $B^x$ of the rim may be non-continuous to provide gaps which form a passage for the separated outer or beaded parts A' of one of the spoke members so that these parts A' may engage with bearing surfaces or stops B' on the rim, this spoke member (or the rim) may then be angularly moved to bring each separate outer part of the spoke member between the said bearing surface or stop B' and a portion $B^x$ of the non-continuous flange, when the spoke members can then be radially expanded. By means of any such arrangements employing a non-continuous flange and separated outer parts on either of the spoke members a kind of bayonet joint connection between the tire base or rim and the spoke members can be effected prior to the radial expansion of the spoke members. When the detachable split flange $B^2$ is used it may have radial cuts or slits $B^{2x}$ extending from near the inner edge to near the outer edge or vice versa to facilitate expansion or contraction of the same, see Figs. 25 to 26.

According to a modification the outer parts A' of the spoke members may be so formed as to embrace suitable parts or surfaces of the tire base or rim, the actual engaging or contacting surfaces being preferably curved or rounded. For example, as shown in Fig. 14 the edges of a solid tire rim may be rounded as shown and the outer parts A' of the spoke members are shaped to form a kind of jaw on the lateral parts of which the rim is actually seated, the rounded part of the jaw engaging with the rounded part of the rim to permit of the slight rocking or angular movement during the radial expansion of the spoke members. In the case of a channel shaped rim such as one carrying a pneumatic tire, the outer parts of the spoke members are shaped to more or less embrace or fit around the curved or rounded edges or sides of the rim as shown in Figs. 16 and 17. A somewhat similar arrangement for a channel rim is shown in Fig. 15. The exact form or the shape of the outer parts of the spoke members depends upon the type of tire base or rim, and this method of seating as well as that above explained can be utilized in connection with solid rubber band tires, solid tires in channel rims, pneumatic tires, etc. In this particular modification as shown in the various Figs. 14 to 24 the outer parts of the spoke members may generally be such that one portion of each outer part engages with the inner surface of the tire base or rim to form a support therefor, and another portion engages with the side or edge of the tire base or rim and the formation of the outer parts of the spoke members may be such as to permit of a slight angular adjustment during the radial expansion of the spoke members. Figs. 14 and 18 to 22 show slightly different modifications for solid tires, Fig. 20 showing one of the spoke members formed with a lateral projection or flange $A^2$ to protect the tire against damage by forcible contact with curbstones or road obstructions. A modification of the lateral projection $A^2$ is shown in Fig. 21. I may use on the same wheel one spoke member having the beaded outer part $A'$ and a second spoke member with its outer part $A'$ formed to embrace part of the tire base or rim as shown by dotted lines in Fig. 22. A somewhat similar arrangement is shown in Fig. 22$^a$ in which a standard wired rim having a loose flange fitting in a grooved part $B^x$ which latter forms a bearing stop for the beaded outer part $A'$ of one spoke member and for a jaw shaped outer part on the other spoke member.

In connection with twin wheels as shown in Figs. 23 and 24 I may employ an intermediate spoke or supporting member $A^3$ shaped at its outer part to form a seating $A^4$ for the adjacent edges of the tire bases B B the outer edges or parts of the two tire bases being engaged and supported by the outer parts $A'$ of two spoke members A A which may be radially expansible by means of an axially movable sleeve C and nut $C'$. This construction of twin wheel may be utilized in connection with spoke members which are dished to the maximum extent at the point between the hub and rim, a bolt $C^3$ being provided at this point as shown for effecting the radial expansion of the spoke members as described in the specification of my prior patent hereinbefore referred to. The foregoing modifications comprise outwardly dished spoke members, but the invention is applicable to spoke members which are inwardly dished for example, as shown in Fig. 29, two separate inwardly dished members A A are formed with abutting projections $A^5$ $A^5$ on their opposing faces the outer parts being beaded at $A'$ to engage with stops $B'$ on the rim B. The main parts of the spoke members are held between flanges in a sleeve C and a nut $C'$ by means of which axial movement can be applied to the spoke members so that being held against movement by the projections $A^5$ $A^5$ they tend to straighten out to enable the outer parts $A'$ to bear against the stops $B'$ and the rim to firmly retain the rim in position. The modification shown in Figs. 30 and 31 illustrates the invention applied to inwardly dished spoke members A A. The inwardly dished spoke members A A are integral with a common hub piece $A°$ and their outer parts are beaded to engage with stop $B'$ on the rim B. The stops $B'$ which may be formed as inclined lateral projections as shown in Fig. 31, to prevent damage to the tire by contact with curbstones or the like are spaced apart, the spoke members have wide lateral openings $A^x$ so that the outer parts of the spoke members can be inserted between the stops and then by relatively angular movement placed against the stops. The radial expansion of the spoke members in this example is effected by screws $C^4$ threaded into bosses on one of the spoke members and adapted to bear against the other spoke member so that the members in being forced away from each other expand radially and thus bear against the rim and the stops $B'$ $B'$.

What I claim and desire to secure by Letters Patent of the United States is:—

1. A metal vehicle wheel comprising a hub, a rim, and oppositely dished spoke members extending between the hub and rim and adapted to be expanded radially under the action of pressure applied in the direction of the length of the wheel axis, the contacting surfaces of the spoke members and rim being of such form that there may be a slight, relative, transverse rocking between said parts as the spoke members are expanded.

2. A metal vehicle wheel comprising a hub, a rim, oppositely dished spoke members radiating from the hub to the rim, said spoke members having formed therein a plurality of slits that extend inwardly from the periphery thereof and the outer ends of the sections between said slits having curved surfaces contacting with corresponding surfaces on the rim, and means for exerting pressure in a transverse direction on the spoke members to expand them against the rim, the curved contacting surfaces of the rim and spoke members permitting a slight, relative, rocking between said parts as the spoke members are expanded.

3. A metal vehicle wheel comprising a hub, a rim, and oppositely dished spoke members extending between the hub and rim and adapted to be expanded radially into close contact with the rim by pressure applied in the direction of the length of the wheel axis, the outer edge of each spoke member being transversely curved and the rim having a coacting curved surface, for the purpose described.

4. A metal vehicle wheel comprising a hub, a rim having on its inner surface a plurality of curved faces, oppositely dished spoke members extending radially from the hub and having curved surfaces corresponding to and bearing against the curved faces of the rim, and means for applying pressure to the spoke members in a transverse direction to expand them against the rim.

5. A metal vehicle wheel comprising a hub, a rim having a plurality of annular contact surfaces, of curved form in cross section, and oppositely dished spoke members extending radially from the hub to the rim and terminating in transversely curved surfaces corresponding to and contacting with the contact surfaces on the rim, said spoke members being adapted to be expanded radially and the curved contact surfaces between them and the rim permitting a slight relative rocking between said parts as the spoke members are expanded.

6. A metal vehicle wheel comprising a hub, a rim having an interior rib the opposite faces of which are curved in cross section, and oppositely dished spoke members extending radially from the hub and having peripheral curved surfaces that bear against said curved faces of the rib on the rim, said spoke members being adapted to be expanded radially by pressure applied transversely thereto and the curved contact surfaces between them and the rim permitting a slight relative rocking between such parts as the spoke members are expanded.

7. A metal vehicle wheel comprising a hub, a rim, and oppositely dished spoke members extending between the hub and rim and adapted to be expanded radially into close contact with the rim by pressure applied in the direction of the length of the wheel axis each of said spoke members having a peripheral bead and the rim having corresponding curved surfaces coacting with said beads whereby there may be a slight, relative, transverse rocking between the spoke members and rim as the spoke members are expanded.

8. A metal vehicle wheel comprising a hub, a rim having on its inner face two annular, transversely curved, seats, and oppositely dished spoke members extending from the hub and each having a circumferentially interrupted peripheral bead bearing against one of the curved seats on the rim, said disks being adapted to be expanded radially by pressure applied in the direction of the length of the wheel axis and the curved contacting surfaces between the spoke members and rim permitting a relative, transverse, rocking between said parts as the spoke members are expanded.

COLIN MACBETH.